United States Patent [19]

Adachi

[11] Patent Number: 5,793,713
[45] Date of Patent: Aug. 11, 1998

[54] MAGNETO-OPTICAL RECORDING DEVICE AND METHOD FOR JUDGING THE RECORDED SIGNALS BY DETECTING MAGNETIZATION STATES

[75] Inventor: Tadashi Adachi, Tokyo, Japan

[73] Assignee: NEC Corporation, Tokyo, Japan

[21] Appl. No.: 731,575

[22] Filed: Oct. 16, 1996

[30] Foreign Application Priority Data

Oct. 19, 1995 [JP] Japan .................... 7-270777

[51] Int. Cl.⁶ .................................................. G11B 11/00
[52] U.S. Cl. ................................................ 369/13; 369/54
[58] Field of Search ............................. 369/13, 14, 54, 369/58, 110; 360/59, 114

[56] References Cited

U.S. PATENT DOCUMENTS

| 5,428,586 | 6/1995 | Kobayashi et al. ............... 369/13 |
| 5,485,433 | 1/1996 | Satomura et al. ................. 369/13 |

FOREIGN PATENT DOCUMENTS

| 5-20720 | 1/1993 | Japan . |
| 5-166189 | 7/1993 | Japan . |
| 5-174502 | 7/1993 | Japan . |
| 6-10559 | 1/1994 | Japan . |
| 6-105509 | 12/1994 | Japan . |
| 6-105510 | 12/1994 | Japan . |

*Primary Examiner*—Tan Dinh
*Attorney, Agent, or Firm*—Young & Thompson

[57] ABSTRACT

A magneto-optical disc recording apparatus is constituted by a pre-output detection circuit, a post-output detecting circuit, a pre-output pulsing circuit, a post-output pulsing circuit, a logical operation circuit, a recording data memory circuit and a comparison operation circuit. An optical head is configured by arranging photodetectors in an array so that the light returned from the areas in the medium on which the laser beam is irradiated can be separately detected at two or more positions along the direction of advance of the laser beam.

8 Claims, 6 Drawing Sheets

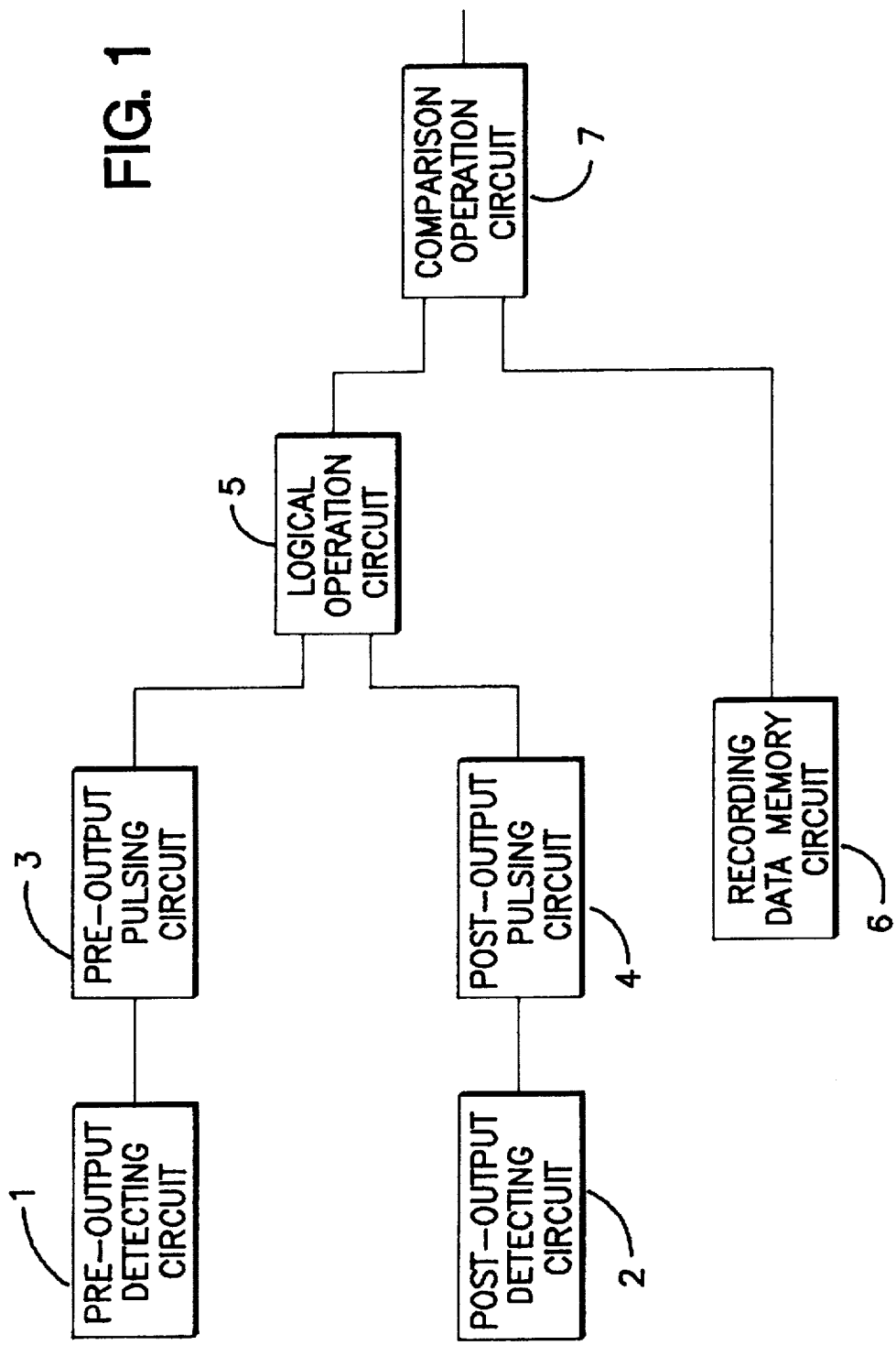

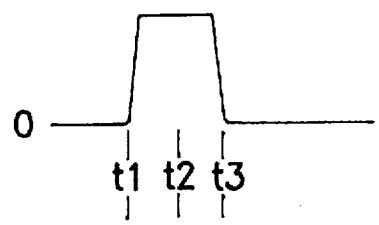
FIG. 2 (1)
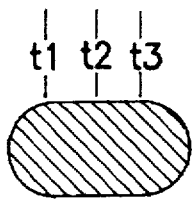
FIG. 2 (2)
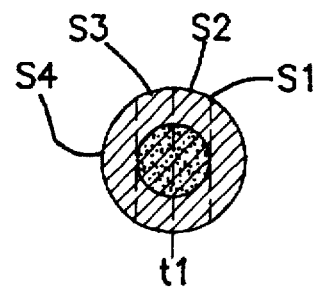
FIG. 2 (3)
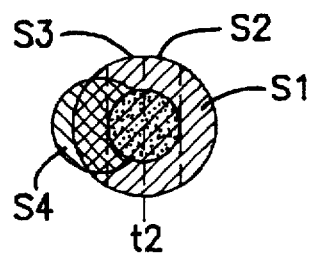
FIG. 2 (4)
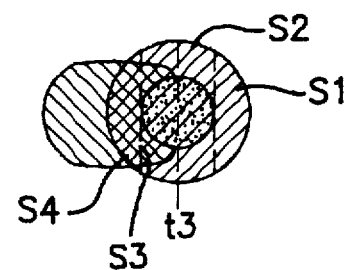
FIG. 2 (5)

RECORDING PULSE

RECORDING AREA

PRE-OUTPUT DETECTING SIGNAL (OUTPUT SIGNAL OF S1)

−R 8k

0

POST-OUTPUT DETECTING SIGNAL (OUTPUT SIGNAL OF S4)

−R 8k

0

+R 8k

PRE-OUTPUT PULSE SIGNAL

POST-OUTPUT PULSE SIGNAL

LOGICAL PRODUCT SIGNAL

VERIFY SIGNAL

FIG. 4A RECORDING PULSE
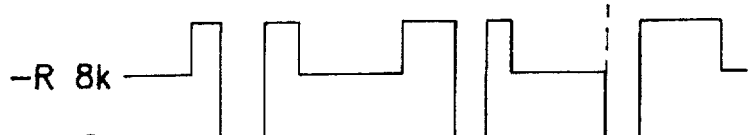
FIG. 4B PRE-OUTPUT DETECTING SIGNAL −R 8k, 0
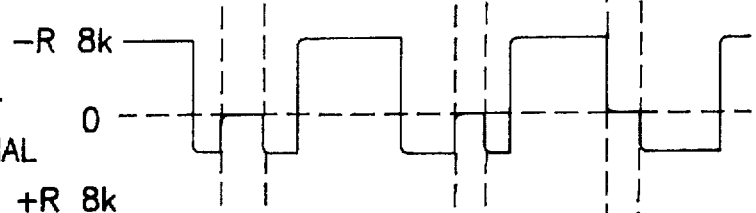
FIG. 4C POST-OUTPUT DETECTING SIGNAL −R 8k, 0, +R 8k
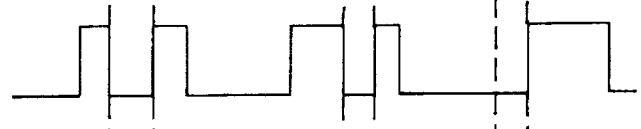
FIG. 4D PRE-OUTPUT PULSE SIGNAL
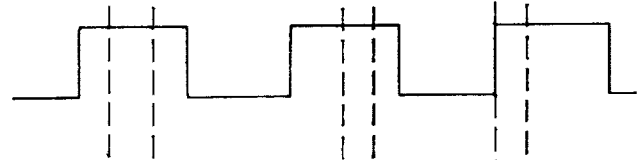
FIG. 4E POST-OUTPUT PULSE SIGNAL
FIG. 4F LOGICAL PRODUCT SIGNAL
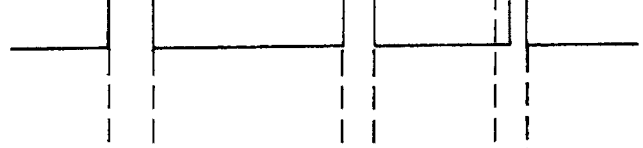
FIG. 4G VERIFY SIGNAL
FIG. 4H MEDIUM DEFECT POSITIONS

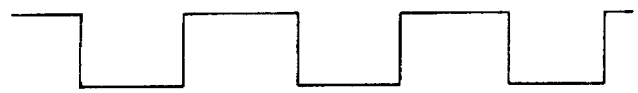
FIG. 5A RECORDING PULSE
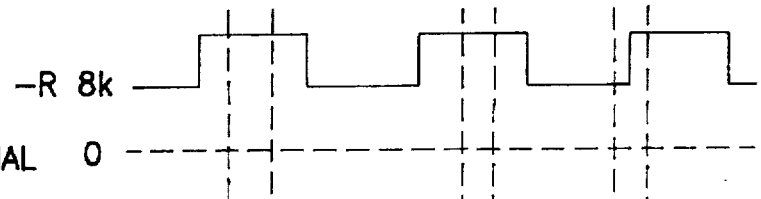
FIG. 5B PRE-OUTPUT DETECTING SIGNAL
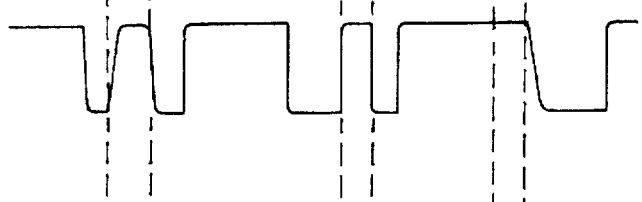
FIG. 5C POST-OUTPUT DETECTING SIGNAL
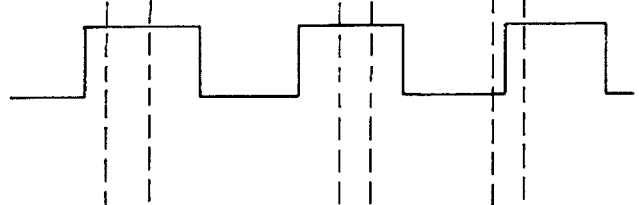
FIG. 5D PRE-OUTPUT PULSE SIGNAL
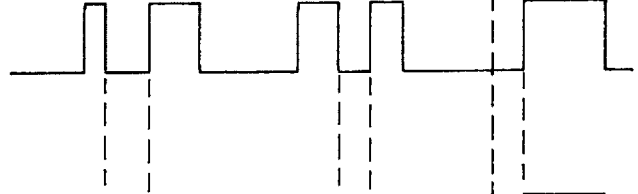
FIG. 5E POST-OUTPUT PULSE SIGNAL
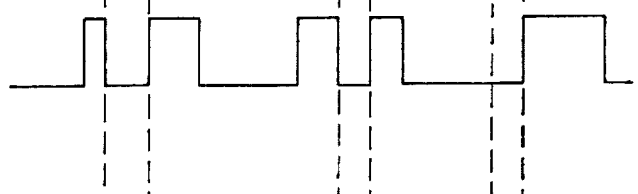
FIG. 5F LOGICAL PRODUCT SIGNAL
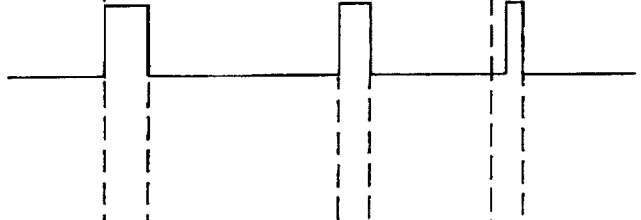
FIG. 5G VERIFY SIGNAL
FIG. 5H MEDIUM DEFECT POSITIONS

MAGNETO-OPTICAL RECORDING DEVICE AND METHOD FOR JUDGING THE RECORDED SIGNALS BY DETECTING MAGNETIZATION STATES

BACKGROUND OF THE INVENTION

1. Field of the Invention

The present invention relates to a magneto-optical disc recording apparatus, and more particularly to a magneto-optical disc recording apparatus equipped to verify a recording simultaneously with making that recording.

2. Description of the Related Art

The magneto-optical disc, on which information can be written, erased and read using a laser beam, is an excellent mass storage medium because of its high recording density, and its application to a variety of storage systems for recording code data, image data and other data has been studied worldwide.

Further, a still picture memory, a moving picture memory or others of the optical disc can be put into practical use in the field of image data as well as the field of a code data file memory, and a range of its application is expected to increase in a new age of multimedia.

Furthermore, as the range of applications increases, improvement of the recording density and/or a higher speed processing can be expected.

The magneto-optical disc recording medium is magnetized in one direction in advance, and a modulated light beam is focused on a surface of the medium so that a temperature of selected portions of the medium reaches the Curie point. This allows information to be recorded as a reversal of magnetization in those portions by an external magnetic field generated by a bias magnet.

To verify whether information has been recorded on an optical disc, there is known a method by which a part of the medium on which information has been recorded is read out when the recorded area has cooled to room temperature and magnetization of the medium is stable. This occurs after one rotation of the disc.

In general, in order to perform readout, a laser beam whose power is lower than that used for recording is irradiated onto the part where information is recorded, and a difference in polarizing direction of the reflected light caused by a difference in magnetizing direction is detected as a readout signal. The recording signal is recorded in the memory in advance, and that signal is compared with the readout signal obtained after one rotation of the disc, to judge whether correct recording has been achieved.

In another known method, a readout beam is provided at a position that is slightly behind that of the recording beam in the direction of disc rotation, and the recorded signal is delayed by a time corresponding to the interval between the recording beam and the readout beam to be compared with a recorded signal obtained by the readout beam. This avoids waiting for one rotation of the disc.

Another known method is disclosed in Japanese patent laid-open publication No. 6-10559, by which a detecting circuit having a structure shown in present FIG. 6 is used to compare an amount of returned light supplied via a polarized beam splitter, an analyzer and an amplifier during recording with a predetermined threshold value, whereby it is possible to judge whether information has been accurately recorded during the recording process.

However, when verifying the accuracy of the information recorded using the method by which readout is made after one rotation of the disc, a time corresponding to one rotation of the disc is further required after recording in order to judge whether the recorded information is accurate, and the overall recording time will be thereby doubled.

In addition, when using a method by which a readout beam is provided at a position that is slightly behind that of the recording beam along the direction of disc rotation and the recorded signal is delayed by a time corresponding to an interval between the recording beam and the readout beam, means for generating multiple beams and a plurality of means for detecting those beams are required, thereby complicating the optical system and the apparatus.

Moreover, because a magneto-optical disc recording/readout apparatus as shown in present FIG. 6 does not use divided detectors for detecting reflected light and instead an output equivalent to a total amount of reflected light is compared with a threshold value, characteristics of magnetization such as directivity of magnetization in the medium during recording cannot be correctly grasped. That is, because an unrecorded area and a recorded area are simultaneously detected, it is difficult to correctly comprehend the recorded state at a boundary between such areas. Further, there is a problem in that the level of the predetermined threshold value is difficult to set.

SUMMARY OF THE INVENTION

In view of the above-described problems in the prior art, it is therefore an object of the present invention to provide a magneto-optical disc recording apparatus capable of recording information and verifying that recording by using one beam, as well as performing verification of the recording simultaneously with that recording, and a method of verifying the accuracy of the information recorded in the recording apparatus by detecting the state of medium magnetization right before and right after recording.

To this end, the present invention provides a magneto-optical disc recording apparatus for recording information by magnetization reversal dynamics of a recording medium obtained by generating a magnetic field applied by an external magnet in the direction opposed to that in which the medium is previously magnetized, while irradiating a laser beam onto the recording medium, the magneto-optical disc recording apparatus including: an optical head equipped to detect reflected light from the laser beam irradiated area at a plurality of positions, containing polarization components of the laser beam; means for detecting the amount of light reflected from a laser beam irradiated area, at a leading edge region of the laser beam; means for detecting an amount of the light reflected from a laser beam irradiated area, at a trailing edge region of the laser beam; means for pulsing signals output from the above two means for detecting the reflected light; means for calculating a logical product of the pulsed signals; means for previously storing data to be recorded; and means for comparing the previously stored data with the signal from which the logical product is obtained.

The optical head for use in the magneto-optical disc recording apparatus according to the present invention preferably comprises photodetectors arranged in an array so that the light reflected from the irradiated areas, including polarization components in the laser beam irradiated onto the medium, can be separately detected at two or more positions in the proceeding direction of the laser beam.

A magneto-optical disc recording method according to the present invention comprises judging whether a signal recorded during recording is accurately recorded, by separately detecting the state of magnetization immediately before, during or immediately after recording using the same laser beam.

BRIEF DESCRIPTION OF THE DRAWINGS

The invention will be best understood by reference to the detailed description which follows, read in conjunction with the accompanying drawings, wherein:

FIG. 1 is a block diagram showing an embodiment of a magneto-optical disc recording apparatus according to the present invention;

FIGS. 2(1) through 2(5) are explanatory views each showing relative positions of a recorded portion and an optical head during the magneto-optical disc recording;

FIGS. 4(a)–4(h) are waveform diagrams showing signals obtained at respective positions illustrated in FIG. 2 when recording is not appropriately performed because of any defect such as fluctuation of a reflectance of the medium;

FIGS. 5(a)–5(h) are waveform diagrams showing signals obtained at respective positions illustrated in FIG. 2 when recording is not appropriately performed because of a magnetization abnormality of the medium.

DETAILED DESCRIPTION OF THE PREFERRED EMBODIMENT

Figure 3A:
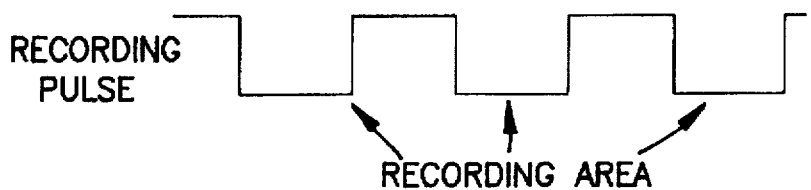
FIGS. 3(a)–3(g) are waveform diagrams showing signals obtained at respective positions illustrated in FIG. 2 when recording is appropriately performed.

In FIG. 1, the magneto-optical disc recording apparatus according to the present invention is constituted by at least a pre-output detecting circuit 1, a post-output detecting circuit 2, a pre-output pulsing circuit 3, a post-output pulsing circuit 4, a logical operation circuit 5, a recording data memory circuit 6 and a comparison operation circuit 7.

FIG. 2(3) shows a sensor for detecting an amount of reflected light, containing polarization components, from the medium, which is divided into four regions along the proceeding direction of the laser beam, and the thus-divided sensors are provided so that an amount of light can be detected at respective positions in the order of S1, S2, S3 and S4 along the proceeding direction of the laser beam.

FIG. 2(1) shows a waveform of a recording pulse; FIG. 2(2), a recorded area formed after completion of recording; and FIG. 2(3), an area on which the laser beam is irradiated and a state of magnetization of the medium immediately after the start of recording. FIG. 2(4) is a view showing an area on which the laser beam is irradiated and the state of magnetization of the medium during recording. Furthermore, FIG. 2 (5) is a view showing an area on which the laser beam is irradiated and the state of magnetization of the medium right after completion of recording.

The principle for detecting recording error will now be explained with reference to FIGS. 2(1)–2(5). The area of the recording beam is filed with diagonal lines in FIG. 2(3), but only the core of the light beam shown by dots in FIG. 2(3) heats the medium to its Curie point.

The area in FIGS. 2(4) and 2(5) filled with oppositely-inclined diagonal lines is that area in which a recording magnetization pattern is formed, and it is magnetized in the direction opposed to that of the areas with no mark. The vertical dotted lines in FIGS. 2(3)–2(5) define the areas in which the sensors S1 to S4 detect the returned light.

Formation of the recording pattern is started by changing the power of the laser beam to a recording power for irradiation at time t1. Since the thermal constant of heating for the recording medium is equal to or less than 10 ns, the distance the recording medium moves during that time is equal to or less than 10% of the formation pattern, so that this value may be neglected.

The change in the amount of reflected light detected by each sensor S1–S4 at each time point in FIGS. 2(3)–2(5) will now be described with reference to FIGS. 3(a)–3(g). In this example, signals corresponding to $R \cdot \theta_K$ and $-R \cdot \theta_K$ are output as signal S1 and S4 depending on the state of magnetization of the medium. A recording direction is defined as $\theta_K$ and an erasing or unrecorded direction is defined as $-\theta_K$. Positions where an amount of light is detected by two sensors S2 and S3 corresponds to positions that precede or are slightly delayed with respect to positions where an amount of light is detected by the two sensors S1 and S4, namely, they correspond to positions at which the recorded area and the non-recorded areas are simultaneously detected. As a result, the sensitivity for separately detecting signals in the non-recorded area and the recorded area may be further deteriorated as compared with that in the case of using the two sensors S1 and S4. The explanation will be given as to use of two sensors S1 and S4 having a high sensitivity for separately detecting $R \cdot \theta_K$ and $-R \cdot \theta_K$.

Figure 3B:
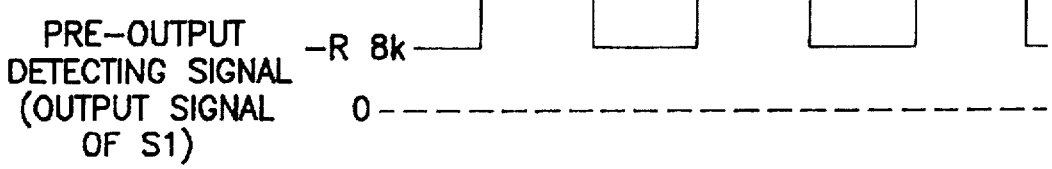

Since the magnetization direction of a pre-output detecting signal (FIG. 3(b)) detected by sensor S1 is always unchanged, the pre-output detecting signal simply indicates an increased amount of the reflected light during irradiation of the recording pulse when the recording pulse changes, as compared with the case when the recording pulse is not irradiated. Then, the amount of the reflected light becomes the same with that obtained when a readout beam is irradiated, simultaneously with completion of irradiation of the recording pulse, and one-way output signal is output. Therefore, the signal detected by sensor S1 is the same output signal any time that the laser is on, and output signals having the same polarization direction are output in one direction before, during and after recording. In this manner, a signal corresponding with the state of magnetization of the medium immediately before recording can be obtained as an output signal of sensor S1.

Figure 3C:
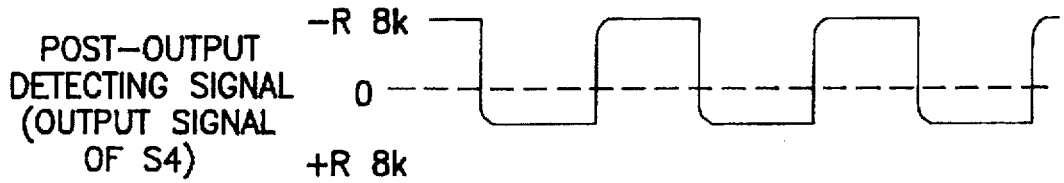
Figure 3D:
Figure 3E:
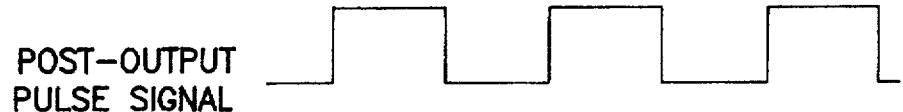

Regarding the post-output detecting signal (FIG. 3(c)) detected by sensor S4, since the detection target is the amount of light returned from a position which trails the center of the recording beam along the direction of advance, there is output a signal which is obtained by magnetization reversal dynamics in the recording direction as the medium temperature cools from the Curie point, i.e., a signal having polarization components in the $+\theta_K$ direction during recording pulse irradiation. Therefore, the post-output detecting signal obtained by sensor S4 has a magnetization component in the recording direction and information concerning the recorded area immediately after recording.

A method for judging whether recording has been correctly performed will now be explained.

The pre-output detecting signal of FIG. 3(b) and the post-output detecting signal of FIG. 3(c) obtained by sensors S1 and S4 are input to the pre-output detecting circuit 1 and the post-output detecting circuit 2, respectively. The pre-output pulsing circuit 3 and the post-output pulsing circuit 4 respectively output a pre-output pulse (FIG. 3(d)) and a post-output pulse (FIG. 3(e)) by pulsing the pre-output detecting signal and the post-output detecting signal based on a threshold value previously determined.

Figure 3F:
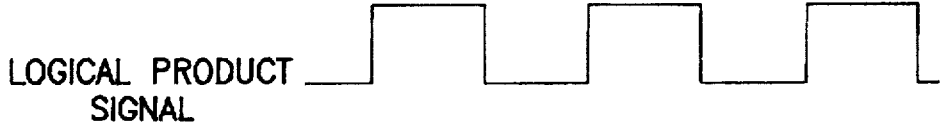
Figure 3G:
Figure 6:
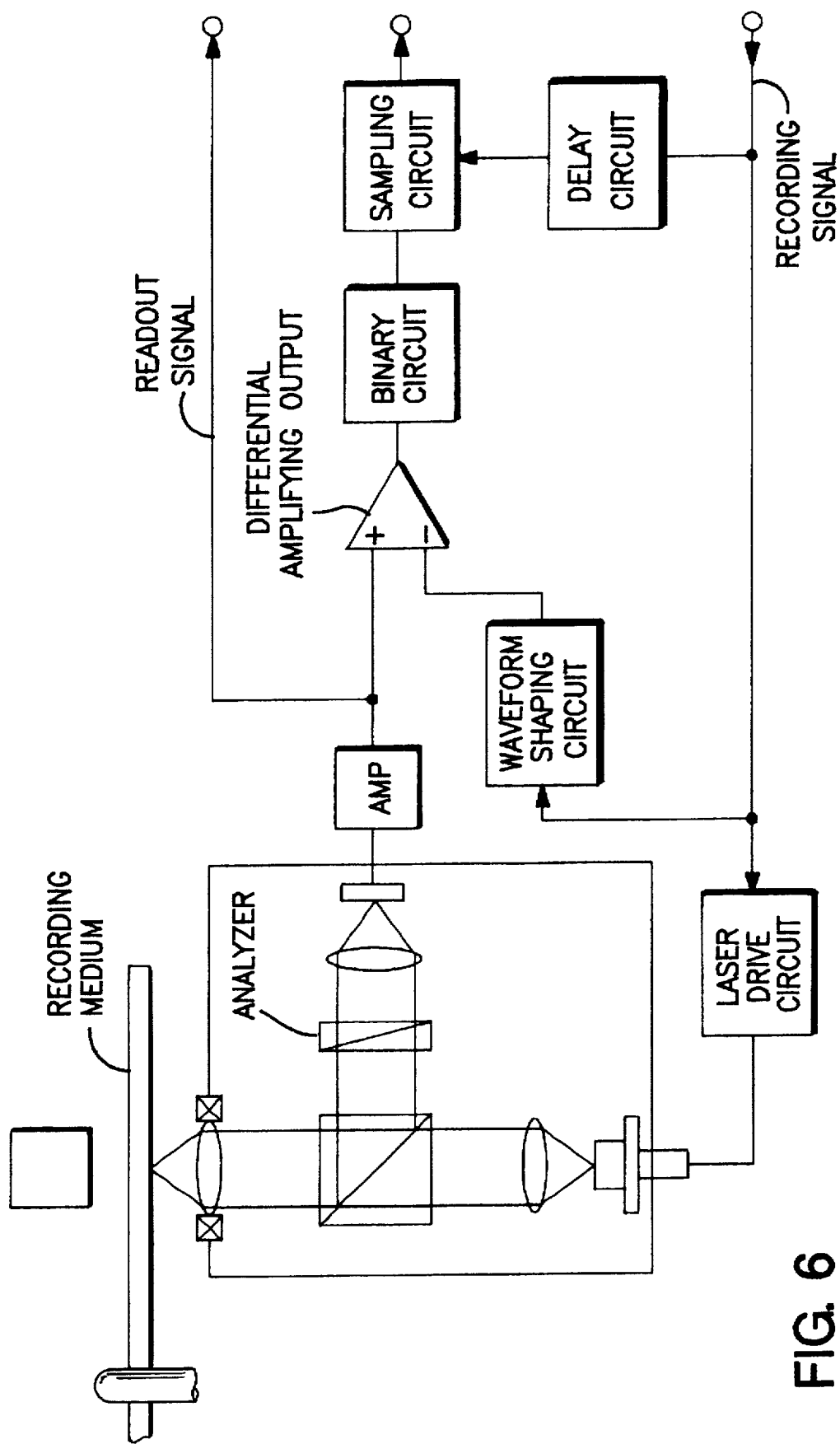
FIG. 6 is a block diagram showing a prior art magneto-optical disc recording/readout apparatus.

The logical operation circuit 5 outputs a logical product signal (FIG. 3(f)) obtained from a logical product of the pre-output pulse and the post-output pulse. The comparison operation circuit 7 calculates an exclusive OR from the logical product signal and a recording data signal (FIG. 3(a)) previously recorded in a recording data memory circuit 6 and thereafter outputs a verify output signal (FIG. 3 (g)). When the recording has been normally carried out, the verify output signal stays low.

The operation will now be explained for the case where a defect of the medium causing irregular reflectance, e.g. , a pin hole, exists in the medium in this embodiment with reference to FIGS. 4(a)–4(h).

It is assumed that a medium defect such as a pin hole exists at positions shown in FIG. 4(h).

The pre-output detecting signal (FIG. 4(b)) output from sensor S1 is a signal proportional to $-R\theta_K$ obtained as mentioned above, and the output signal level varies at positions corresponding with the medium defect such as a pin hole.

After the signal output from sensor S4 is detected, the post-output detecting signal displays a minute change in a signal level positions corresponding with the medium defect, as shown in FIG. 4(c).

Further, pulsing the pre-output detecting signal and the post-output detecting signal based on a predetermined threshold value by the pre-output pulsing circuit 3 and the post-output pulsing circuit 4 obtains the pre-output pulse and the post-output pulse shown in FIGS. 4(d) and 4(e), respectively.

The comparison operation circuit 7 calculates an exclusive OR from the logical product signal (FIG. 4(f)), which is output after obtaining a logical product from the pre-output pulse and the post-output pulse by the logical operation circuit 5, and the recording data signal (FIG. 4(a)) previously recorded in the recording data memory circuit 6, and the verify output signal (FIG. 4(g)) is thereafter output. Since the verify output signal shows a convex waveform at signal defect portions, the level of the output signal does not stay low over the entire area of the recorded region.

The operation of the present embodiment will now be explained for the case where recording has not been performed correctly due to a magnetization abnormality of the recording layer. In particular, the description will be given for the case where the direction of magnetization is not reversed to the recording direction, with reference to FIGS. 5(a)–5(h).

It is assumed that a defect caused by the magnetization abnormality of the medium exists at positions shown in FIG. 5(h).

As the pre-output detecting signal output after detection of the output signal fed to the S1, a signal (FIG. 5(b)) proportional to $-R\cdot\theta_K$ can be obtained as mentioned above, and the output signal level does not change even at positions corresponding with the medium defect caused by the magnetization abnormality, i.e. the magnetic layer exists and magnetization reversal is not made. As for the post-output detecting signal (FIG. 4(c)) produced from the output of sensor S4, its signal level at positions corresponding with the medium defects yields fluctuation in the medium defect areas because magnetization reversal dynamics is not made in the recording direction.

Moreover, by pulsing the pre-output detecting signal and the post-output detecting signal based on a predetermined threshold value by the pre-output pulsing circuit 3 and the post-output pulsing circuit 4 the pre-output pulse and the post-output pulse corresponding those shown in FIGS. 5(d) and 5(e) can be obtained. In addition, the logical product signal (FIG. 5(f)), which is output after the logical product is obtained from the pre-output pulse and the post-output pulse by the logical operation circuit 5, and the recording data signal (FIG. 5(a)) previously recorded in the recording data memory circuit 6, are subjected to the operation to calculate an exclusive OR by the comparison operation circuit 7, and the verify output signal (FIG. 5(g)) is thereafter output. Here, since the verify output signal demonstrates a convex waveform at signal defect portions, the level of the output signal does not stay low over the entire recorded area.

As mentioned above, it is possible to confirm if normal recording has been carried output or not depending on absence/existence of the medium defect by judging whether the verify output signal stays low.

The optical medium disc recording apparatus according to the present invention therefore includes: an optical head equipped to detect the reflected light from the laser beam irradiated area, at a plurality of positions containing polarization components of a laser beam; a device for detecting an amount of the light reflected from a leading edge region of the laser beam irradiated area, a device for detecting an amount of the light returned from a trailing edge region of the laser beam irradiated area, a device for pulsing respective signals output from the two devices for detecting the amount of reflected light using a predetermined threshold value; a device for obtaining a logical product of the pulsed signals; a device for storing data to be recorded; and a device for comparing the stored signal with the signals from which the logical product is obtained, thereby confirming whether information is correctly recorded on the recording medium. Further, it is possible to verify if recording is correctly performed simultaneously with that recording, and recording and verification of that recording can be carried out using one beam.

Moreover, since the employed optical head is constituted by arranging photodetectors in an array so that the light returned from the laser beam irradiated areas, containing polarization components of the laser beam irradiated onto the medium, can be separately detected at two or more positions in the advancing direction of the laser beam, the state of magnetization of the medium immediately before and after recording can be easily verified. In addition, since the sensitivity for verifying whether the recording information is normally recorded can be improved, a threshold value set by the pulsing device can be readily determined as compared with the prior art.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magneto-optical disc recording apparatus comprising:

means for applying a magnetic field in a direction opposite that in which a recording medium is previously magnetized, simultaneously with irradiation of a laser beam onto said recording medium, thereby to record information on the recording medium by magnetization reversal dynamics;

an optical head for irradiating the laser beam onto said recording medium, said optical head having means for detecting reflected light from the laser beam irradiated areas at a plurality of positions, containing polarization components of said laser beam, said means for detecting reflected light comprising a first detector portion receiving reflected light from a leading edge region of said laser beam, and a second detector portion receiving reflected light from a trailing edge region of said laser beam;

means for pulsing signals respectively output from said first and second detector portions;

means for calculating a logical operation of the pulsed signals;

means for previously storing data to be recorded; and means for comparing the stored signal with signals from which the logical operation is obtained.

2. A magneto-optical disc recording apparatus as set forth in claim 1, wherein said logical operation is a logical product.

3. A magneto-optical disc recording apparatus as set forth in claim 1, wherein said means for detecting reflected light comprises an array of photodetectors positioned to separately detect reflected light at least two positions along an advancing direction of the laser beam.

4. A magneto-optical disc recording method in an optical disc recording apparatus, comprising the steps of:

(a) detecting a state of magnetization of the disc immediately before recording;

(b) detecting a state of magnetization of the disc immediately after recording; and (c) judging whether a signal to be recorded has been correctly recorded by comparing said signal to information retrieved by said steps (a) and (b).

5. In a magneto-optical recording device comprising means for applying a magnetic field to a uniformly magnetized recording medium in a magnetization direction opposite that of said medium, and a recording laser generating a laser beam that heats irradiated portions of said medium to its Curie temperature, thereby to allow said applying means to selectively reverse the magnetization direction of said recording medium only in said irradiated portions, the improvement in combination therewith comprising:

a first photodetector element positioned to receive first light reflected by said recording medium from only a leading edge region of said laser beam, said first light varying in intensity according to operation of said recording laser but not in polarization angle, a second photodetector element positioned to receive second light reflected by said recording medium from only a trailing edge region of said laser beam, said second light varying in intensity according to operation of said recording laser and in polarization angle according to information recorded on said medium, a logic circuit that produces a logical product signal from input signals generated by said first and second photodetector elements, and a comparison circuit that compares said logical product signal with a pre-recorded recording signal, to detect deviations of said recorded information from said recording signal.

6. The device according to claim 5, wherein said laser beam comprises a central core that heats said irradiated portions to the Curie temperature, and a surrounding annular portion which does not heat said medium to the Curie temperature, said first and second photodetector elements receiving reflected light only from separated regions of said annular portion.

7. The device according to claim 5, wherein said first light is substantially only that reflected from regions of said medium whose magnetization direction is not yet reversed, and said second light is substantially only that reflected from regions of said medium whose magnetization direction has been reversed.

8. The device according to claim 6, wherein said first and second photodetector elements are separated from one another by a distance approximately equal to the width of a light beam reflected from said central core.

* * * * *